United States Patent
Schulz et al.

(10) Patent No.: US 6,606,125 B1
(45) Date of Patent: Aug. 12, 2003

(54) SHUTTER, IN PARTICULAR FOR AN OBJECTIVE, AND A CCD-CAMERA

(75) Inventors: Dieter Schulz, Muehlheim (DE); Norbert Haeckl, Leibertingen (DE)

(73) Assignee: Henke-Sass, Wolf GmbH, Tuttlingen (DE)

( * ) Notice: Subject to any disclaimer, the term of this patent is extended or adjusted under 35 U.S.C. 154(b) by 0 days.

(21) Appl. No.: 09/329,836

(22) Filed: Jun. 10, 1999

(30) Foreign Application Priority Data

Jun. 18, 1998 (DE) .................... 298 10 950 U

(51) Int. Cl.$^7$ .................... G03B 7/00; H04N 5/225
(52) U.S. Cl. .................... 348/362; 348/341
(58) Field of Search .................... 348/222.1, 241, 348/250, 362, 363, 76; 382/276, 293, 294, 300; 396/507, 505

(56) References Cited

U.S. PATENT DOCUMENTS

| | | | |
|---|---|---|---|
| 4,598,980 A | | 7/1986 | Doi et al. |
| 4,831,456 A | | 5/1989 | Takamura |
| 5,809,357 A | * | 9/1998 | Hamasaki .................... 396/505 |
| 5,827,172 A | | 10/1998 | Takahashi |
| 6,069,651 A | * | 5/2000 | Tsuyuki et al. .................... 348/75 |
| 6,287,296 B1 | * | 9/2001 | Seiler et al. .................... 606/5 |
| 6,356,304 B1 | * | 3/2002 | Kawaguchi et al. ..... 348/222.1 |
| 6,421,123 B1 | * | 7/2002 | Shiraishi .................... 356/399 |

FOREIGN PATENT DOCUMENTS

| | | |
|---|---|---|
| DE | GM 19 43 734 | 8/1966 |
| DE | AS 20 31 828 | 3/1973 |
| DE | 27 12 837 B2 | 2/1980 |
| DE | 36 29 435 C2 | 1/1988 |
| DE | 36 36 684 A1 | 5/1988 |
| DE | 42 31 251 C2 | 9/1994 |
| DE | 42 10 555 C2 | 3/1997 |
| DE | 197 42 973 A1 | 4/1998 |

OTHER PUBLICATIONS

Article: Ojeda Castaneda, Jorge, et al.: Bessel annular apodizers; imaging characteristics. In: Applied Optics, vol. 26, No. 14, 15, Jul. 1987, S. 2770–S. 2772, vollst. Schrift.
Article: Fowles, Grant R.: Introduction to Modern Optics, Holt, Rinehart and Winston, Inc., New York, et al., 1968, S. 137–139.
English Abstract of DE–AS 20 31 828.
English Abstract of DE–GM 19 43 734.
English Abstract of DE 27 12 837 B2.
*English Abstract of DE 36 36 684 A1.
*English Abstract of DE 197 42 973 A1.
*English Abstract of DE 42 31 251 C2.
*English Abstract of DE 36 29 435 C2.
*English Abstract of DE 42 10 555 C2.

* cited by examiner

*Primary Examiner*—Wendy R. Garber
*Assistant Examiner*—Jacqueline Wilson
(74) *Attorney, Agent, or Firm*—Reed Smith LLP

(57) ABSTRACT

A shutter for use as an objective for improving the depth of focus in a camera is disclosed. The shutter has, in a central area, a radially uniform transmission function averaged over the circumferential angle. The radial transmission function first drops off toward zero in a radial transition area which is a continuation of the central area and which has a quantity n of cutouts which extend toward the radial outside and are spaced apart from one another at equal angles 360°/n in the circumferential direction. The quantity n of cutouts has the value 5, 6 or 7.

22 Claims, 2 Drawing Sheets

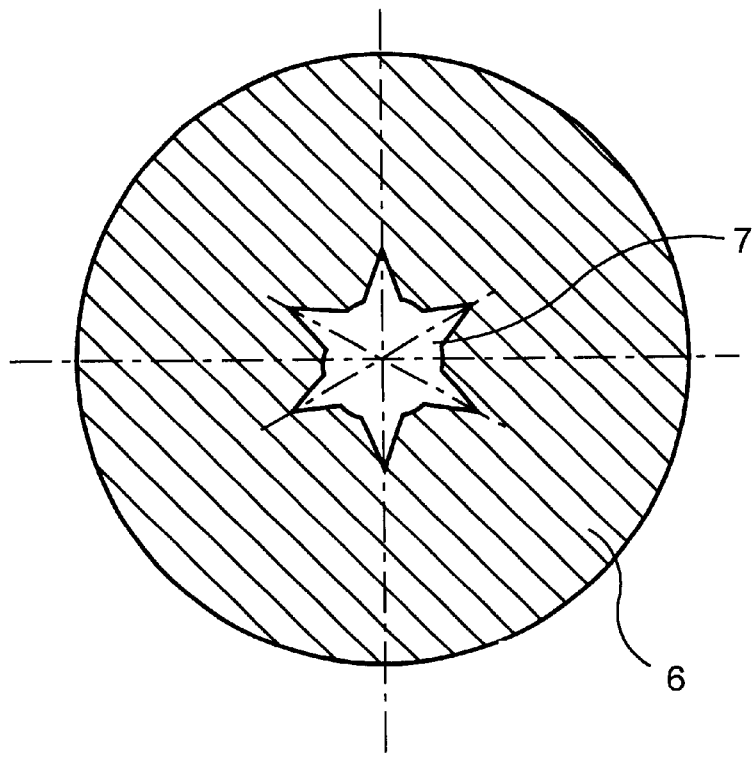
F I G. 3
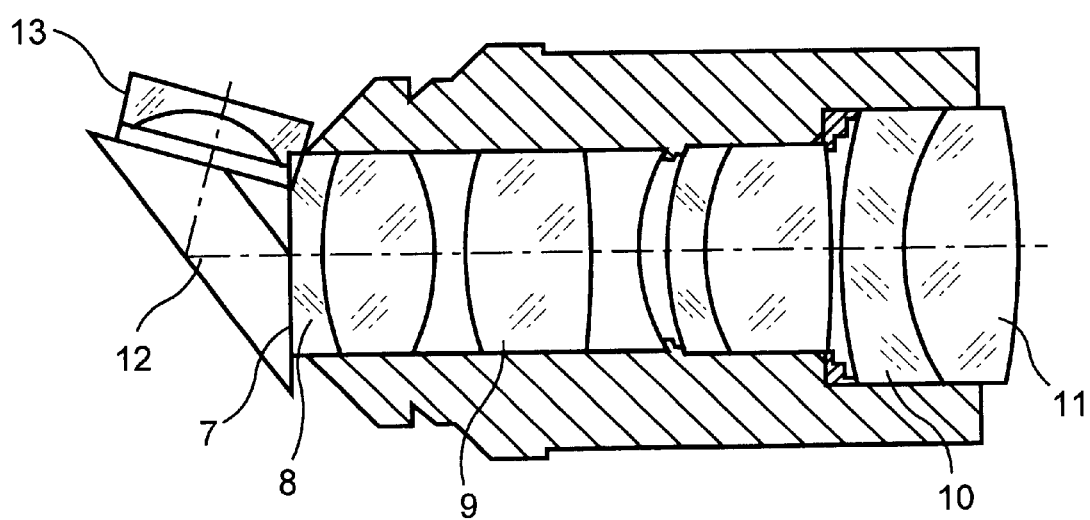
F I G. 4

SHUTTER, IN PARTICULAR FOR AN OBJECTIVE, AND A CCD-CAMERA

BACKGROUND OF THE INVENTION a) Field of the Invention

The invention is directed to a shutter, in particular for an objective, for improving the depth of focus in a camera, wherein the shutter has, in a central area, a radially uniform transmission function averaged over the circumferential angle. The invention is further directed to a CCD-camera, especially for endoscopes, in which the shutter can advantageously be used together with the objective.

b) Description of the Related Art

Objectives are known from photographic cameras, for example. In order to limit the light intensity in the exposure of a photographic film, a shutter is normally provided in objectives of this type. While the shutter is usually adjustable in this application and, for that reason, does not appear completely round, this shutter still essentially constitutes a round hole optically, that is, it has a radially independent transmission function in the area of a hole.

However, this shutter has additional functions. First, by limiting the light to rays in the vicinity of the optical axis, the imaging characteristics of the objective are improved by stopping out the outer lens areas. On the other hand, an increased depth of focus is achieved as the shutter decreases in size.

However, the design of this shutter can be problematic particularly in small cameras, for example, CCD-cameras in endoscopes which often require small shutters because of miniaturized construction. A shutter which is too small also has worsened resolving capability for image presentation because, in view of the wavy nature of the light at the edge of the shutter, there is always a noticeable diffraction which limits the possible image resolution and predominates when the shutter is reduced in size below a certain lower limit.

Particularly in the case of CCD-cameras in which the individual elements for image presentation are usually in the order of magnitude of micrometers and with which diffraction effects can also be detected in the micrometer range, a clearly visible diffraction limitation occurs already in shutters in the order of magnitude of millimeters. Naturally, the shutters could be made larger; but there would be a loss in the depth of focus, which is completely unacceptable in the case of endoscopes when the image recording is carried out by means of a CCD-camera.

OBJECT AND SUMMARY OF THE INVENTION

It is the primary object of the invention to improve known shutters, especially in connection with objectives, so that they are suitable particularly for CCD-cameras and so that the depth of focus as well as the resolution for image presentation can be increased by means of them.

This object is met in a shutter of the type described above in that the transmission function determining the shutter first drops off toward zero in a radial transition area which is a continuation of the central area mentioned above and which has a quantity n of cutouts which extend toward the radial outside and are spaced apart from one another at equal angles 360°/n in the circumferential direction, and the quantity n of cutouts has the value 5, 6 or 7. It is possible to use a shutter of this kind, according to the invention, in any type of optical beam path, for example, in the beam path of a laser, etc., also without an objective. However, the preferred use of the shutter in connection with an objective is referred to hereinafter.

First of all, it is surprising in terms of physics that this object can be met at all, since the shutter diameter was previously regarded as an insurmountable barrier to improvement of resolution. Heretofore, there has been no suggestion whatsoever for straying from circular shutters with a radial rectangular transmission function, since these were believed to have the best depth of focus and the loss of resolution was always taken for granted with the smaller diameter of the shutter because all of the familiar physics textbooks attributed the maximum attainable resolving capability exclusively to the very small lens diameter or shutter diameter.

Shutters of the type mentioned above always have a sharp edge, so that the diffraction pattern limiting the resolution can be represented mathematically essentially by a zero-order Bessel function. In contrast to this, however, the diffraction pattern of the shutter, according to the invention, for the objective is still a sum of different Bessel functions as a result of the transition area provided according to the invention. Through the selection of the shape of the shutter and/or the configuration of the transmission function, for the purpose of displaying the diffraction pattern, contributions of higher Bessel functions can be added which, because of a different phase relationship, can narrow the broad maximum of the zero-order Bessel function in the neighborhood of small radii. Particularly also due to the area which is provided according to the invention for the diffraction and which is widened by the transition area, the zero-order Bessel function contribution dominating the resolution is also scaled to smaller radii, so that, as a result, the diffraction pattern limiting the resolution is even substantially sharper in the neighborhood of zero. However, because of the higher light intensity in the central area, the depth of focus is essentially entirely determined thereby. Accordingly, with an improved depth of focus, an improved resolution is also possible in particular.

Surprisingly, it has been shown that a camera which is outfitted with a shutter of this type for the objective of the camera is also substantially more sensitive to light. In fact, this could be expected because the central area is somewhat enlarged by the transition area with respect to the transmissivity of the shutter. But at the same time it would have to have been expected that the depth of focus would decrease. However, with a suitable design of the shutter according to the invention, it was observed that the depth of focus did not decrease in spite of increased-light sensitivity.

Due to the cutouts which extend on the radial outside and are spaced at equal angles 360°/n in the circumferential direction and because of the resulting symmetry, the Bessel functions which additionally contribute to the diffraction and whose solution, as is well known, runs in periodicity with the circumferential angle are selected. Accordingly, this further development forces the occurrence of higher-order Bessel functions than the zero order, especially of an order of the whole number n of 5, 6 or 7, which also enables the selection of a suitable phase position of these contributions based on a suitable shape for a particularly favorable increase in the resolving capability.

Surprisingly, it has proven particularly advantageous when the number n has the value 5, 6 or 7. Since these findings were made through experimentation, a plausible explanation was even found. These Bessel functions have a maximum in the neighborhood of the drop-off of the zero-order Bessel function. When it is made possible, as a result of appropriate shaping of the shutter, to generate these contributions in reverse phase position to the zero-order Bessel function, the total drop-off of the diffraction patterns in the area of the diffraction maximum is substantially steeper and the possible resolution is thus improved in a substantially more effective manner. A shape of this kind is shown later in an embodiment example.

The desired transmission function of the shutter could also be achieved through arrangements of holes in the shutter material in the radial transition area. However, such holes can cause new diffraction effects, so that the resolution by means of the provided transition area remains far from optimum. Accordingly, based on these considerations, a preferable shutter will have no closed cutouts and, above all, no circular cutouts in the transition area forming a continuation of the central area.

Based on these considerations, the shutter was further optimized. According to an advantageous further development in this respect, it has proven particularly favorable when the shutter is formed with a star-shaped transition area around a circular central area.

In particular, the following further developments of the invention have proven especially favorable for the design of the shutter, according to the invention, for an objective. In a first further development of the invention, it is provided in this connection that the radial transmission function drops off to 90% of the central value at a radius $R_1$ and to 10% of the central value at a radius $R_2$, wherein $R_2-R_1$ is greater than $0.1 R_1$.

In another advantageous further development of the invention in this connection, it is provided that the radial transmission function drops off to 90% of the central value at a radius $R_1$ and to 10% of the central value at a radius $R_2$, and $(R_2-R_1)<R_1$.

It has been determined in particular that the above-mentioned advantageous results can be achieved in a simple manner when $R_2/R_1$ is fixed at $0.8\pm0.1$.

Due to the fact that the radial area continuing the central area is set at the order of magnitude of 10% to 100% of the radius of the central area, the contribution of larger proportions to the increased resolution is not too small to be effective on the one hand and, on the other hand, the continuation of the area up to twice the central area also leads to an approximate doubling of the resolving capability, so that a noticeable increase in resolution can be seen without a substantial worsening of the depth of focus. In particular, the indicated value of $R_2/R_1-1=0.8\pm0.1$ has proven particularly suitable for practical applications.

Based on the ideas expressed above which were formed by means of mathematical considerations, such a simple shutter shape would not have been expected. In particular, a shutter of this type can be manufactured in a simple manner. With regard to the further improvement of the shutter according to the invention, this was an additional unexpected result which was particularly advantageous for the use of these shutters.

In another further development of the invention, the shutter is vacuum-deposited on a lens as an opaque layer, especially as a metal layer.

Initially, no special improvement was anticipated with respect to this embodiment form either. However, it has been shown that a substantial increase in resolution can be achieved in this way compared, for example, to an individual shutter which is placed in front of a lens. This is due primarily to the fact that the light passing through the shutter is immediately conducted into the glass of the following lens, so that deviations in the light propagation direction based on Snell's law of refraction, whereby every change in angle is reduced with respect to the surface normal, are compensated. Therefore, diffraction effects due to proximity to a glass surface resulting from said lens can be kept small.

This advantage becomes apparent above all when the surface normal remains constant in the area of the shutter opening or varies only slightly over the shutter area, namely, when this lens is plane or flat. The above-mentioned advantages can be achieved in an extremely simple manner, for example, in a commercially available CCD-camera, when the shutter is vacuum-deposited on the foremost lens of the objective. The fact that common CCD-cameras with a plane first lens surface are commercially available and the possibility of vacuum-depositing the metal layer on these lenses without completely disassembling the camera advantageously simplifies the required modification in which a shutter according to the invention is used on the objective that is already provided for the camera.

Due to the somewhat elongated optics, it is extremely advantageous for a favorable arrangement of the camera, for endoscopy in particular, to record images from areas which lie at an angle to the optical axis of the CCD-camera. For this purpose, it is provided that a prism and/or an achromat and/or a negative individual lens are/is arranged in front of the shutter located on the front lens. The prism allows a recording of images at an angle to the optical axis of the objective. The achromat is provided, for example, in order to correct for chromatic aberrations caused by the prism.

As stated above, cameras of the type mentioned above can be used in a particularly advantageous manner for endoscopy and the abovementioned embodiment forms for the shutters which will be better understood from the following embodiment forms were optimized especially for the field of endoscopy. However, it has also been shown that the objectives outfitted with a shutter of this kind are also particularly suitable for other CCD-cameras and other objectives which can be used for imaging.

The invention is described more fully in the following with reference to the accompanying drawings.

BRIEF DESCRIPTION OF THE DRAWINGS

In the drawings:

FIG. 3 shows a particularly advantageous construction of a shutter; and

FIG. 4 shows an objective unit for a CCD-camera which is especially suitable for endoscopy and which is outfitted with the shutter according to the invention shown in FIG. 3.

DESCRIPTION OF THE PREFERRED EMBODIMENTS

Figure 1:
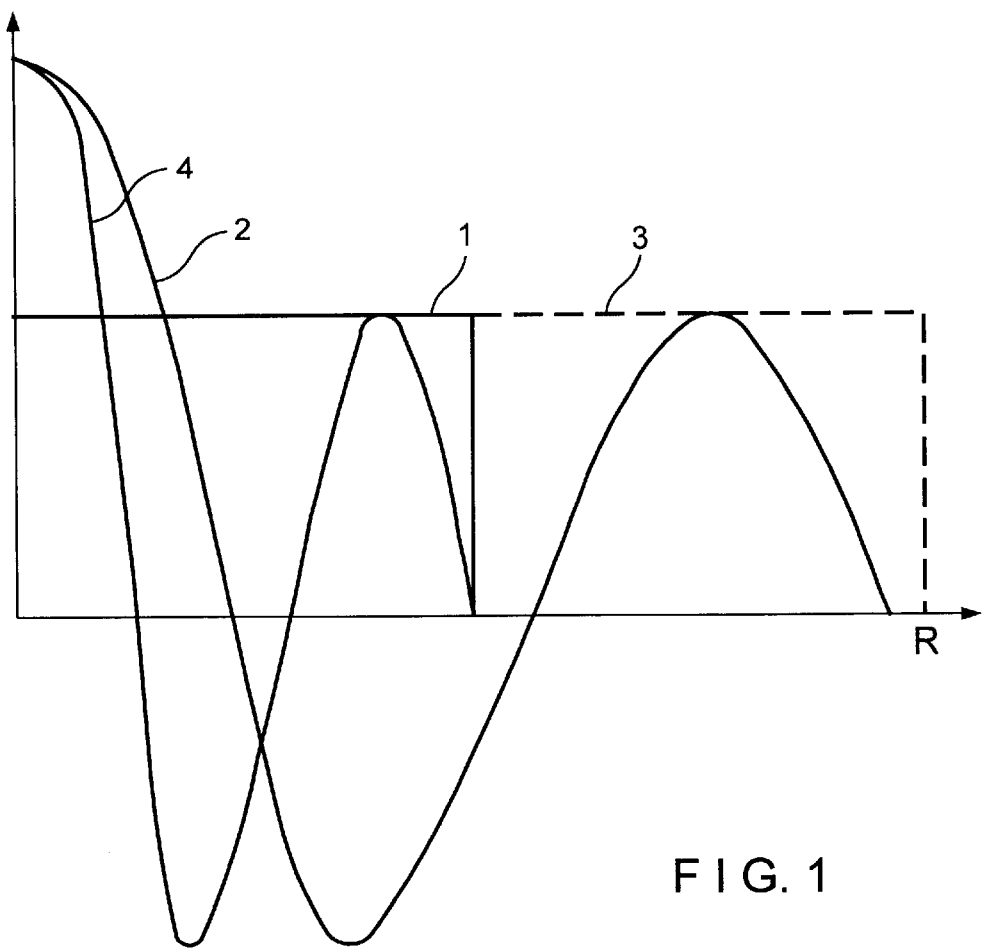
FIG. 1 illustrates the resolving capability as a function of the shutter diameter.

The known curve of a diffraction pattern in a shutter is shown schematically in FIG. 1 for purposes of illustration. In particular, FIG. 1 shows curves 1 and 3 of transmissions averaged about the circumference as a function of the radius R, the distance from the center of the shutter.

In a round shutter, the transmission function is essentially a box profile as is shown schematically, for example, in FIG. 1 by reference number 1. Further, curve 2 shows schematically the amplitude of the associated diffraction pattern at a shutter as follows from the dimensions of the shutter and from the wavelength of the light passing through the objective. When the shutter diameter is increased as is shown in dashed lines by curve 3, the expected diffraction pattern is scaled based on the known law of diffraction with radius R and shifts within a narrow area as is shown schematically by curve 4.

This means that the resolving capability improves as the size of the shutter in an objective increases. On the other hand, the depth of focus which depends in practice on the angular area comprehended by the objective decreases.

Figure 2:
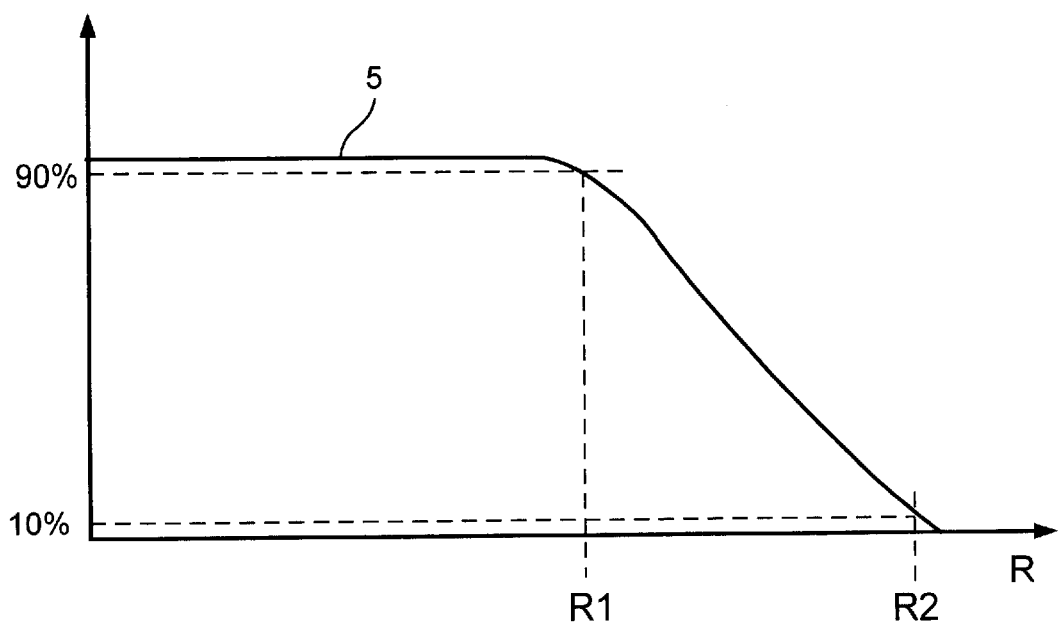
FIG. 2 illustrates the transmission function of a shutter according to the invention which can be used particularly advantageously in an objective.

In comparison with the conventional circular shutter with the rectangular transmission function shown by curve 1, a gentler transition from maximum to minimum transmission is suggested in this case as is shown by way of example by reference number 5 in FIG. 2.

This function initially shows a flat area and then a gradual drop-off between $R_1$ and $R_2$ corresponding to 10% and 90% of the value in the central area.

Because of this smooth transition, even closer contributions in the diffraction pattern relative to the diffraction curve 2 expected in the box profile are added to the diffraction pattern of the shutter as can be seen, for example, in curve 4 in FIG. 1, so that the resolution is already improved in this way.

Radii $R_1$ and $R_2$ which relate to the drop-off of 90% and 10% of the transmission curve are shown in FIG. 2 to define the desired transmission behavior. It has proven particularly advantageous for a shutter which limits the central beam path of an objective when $R_2-R_1>0.1\ R_1$, $R_2-R_1<R_1$ and $R_2/R_1-1=0.8\pm0.1$.

The transmission curve shown in FIG. 2 can be achieved, for example, with a round shutter which is formed by means of a darkened quartz plate which transmits in the central area and whose degree of darkness continuously increases toward the outside. However, it has been shown that it is also possible to realize this transmission function according to the invention by means of a nonuniform curve of the transmission function in the circumferential direction because the components contributing to the curve 2 which originate as a result of the transition area are essentially determined by a higher-order Bessel function which approaches zero in the neighborhood of R=0, but has a maximum which is offset from the zero point. With an appropriate phase position given by the shape of the shutter, this results in a path interference of a majority of the intensity in the wide flank of then diffraction curve and the resolution is further improved.

Accordingly, it is particularly advantageous for the resulting deviation from a uniform transmission in the circumferential direction when the shutter is constructed by means of an opaque material in which cutouts are provided in the transition area in the circumferential direction so as to be spaced apart at identical angles 360°/n. The chief effect brought about by this is that the lowest-order Bessel function which contributes to the increase in resolution through changed phases is of the nth kind. Particularly favorable increases in resolution have been shown in particular when n is set at a value 5, 6 or 7. In an embodiment form, the quantity n can be an integral multiple of the value 5, 6 or 7.

FIG. 3 shows a shutter 6 of the type mentioned above which is constructed as a star-shaped cutout 7 in an opaque material. This star-shaped shutter opening 7 has a six-sided symmetry, that is, it is constructed such that n=6.

This shutter was used in an objective according to FIG. 4. The shutter structure 6 and 7 shown in FIG. 2 was vacuum-deposited on a plane surface of a front lens 8. Aluminum has proven to be a particularly suitable material for this purpose as a metal layer.

The sectional view in FIG. 4 shows the front lens 8 in the objective followed by an expansion lens 9 which is followed in turn in the light propagation direction by a plurality of field lenses 10, 11. This type of objective is especially suited to CCD-cameras.

In order to be able to acquire CCD images at an angle to the optical axis, a prism 12 was used in the embodiment example, wherein an achromat 13 is provided in front of the prism to compensate for chromatic aberrations caused by the prism 12 in that its dispersion behavior is selected in such a way that it compensates for the dispersion given by the prism 12. In this way, loss of resolution due to different wavelengths is limited to a great extent, so that an especially high resolution results on the whole with the shutter shown in FIG. 2 when this objective is used in a CCD-camera, wherein its diffraction propagation was less than the CCD-elements used for image recording. It is also possible to use a negative individual lens instead of a prism.

In the construction shown in FIG. 4, the shutter 7 also limits to near-axis beams, so that the depth of focus in the objective according to FIG. 4 is also increased relative to shutters with a rectangular radial transmission function in which the shutter must always have a certain minimum size in order to prevent loss of resolution.

However, not only CCD-cameras can be outfitted with these objectives with the shutter shown in FIG. 3, or also in general with a transmission characteristic such as that shown in FIG. 2, but also photographic objectives, e.g., for microfilming, in which a high resolution is also wanted.

While the foregoing description and drawings represent the present invention, it will be obvious to those skilled in the art that various changes may be made therein without departing from the true spirit and scope of the present invention.

What is claimed is:

1. A shutter, for use on an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the radial transmission function drops off to 90% of the central value at a radius $R_1$ and to 10% of the central value at a radius $R_2$, wherein $(R_2-R_1)>0.1\ R_1$.

2. The shutter according to claim 1, wherein the radial transmission function drops off to 90% of the central value at a radius $R_1$ and to 10% of the central value at a radius $R_2$, and $(R_2-R_1)<R_1$.

3. The shutter according to claim 1, wherein $R_2/R_1-1=0.8\pm0.1$.

4. The shutter according to claim 1, wherein the quantity n is a whole-number multiple of the value 5, 6 or 7.

5. The shutter according to claim 1, wherein the shutter has a star-shaped transition area outside of a circular central area.

6. The shutter according to claim 1, wherein the shutter is vacuum-deposited on a lens as an opaque layer.

7. The shutter of claim 6, wherein the opaque layer is a metal.

8. The shutter according to claim 6, wherein the shutter is vacuum-deposited on a front plane surface of the lens.

9. The shutter according to claim 6, wherein the shutter is arranged on the foremost lens of the objective.

10. The shutter according to claim 1, wherein the shutter is arranged behind a prism or an achromat or a negative individual lens.

11. A CCD-camera for an endoscope, having a shutter for use as an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the shutter is vacuum-deposited on a lens as an opaque layer.

12. A shutter, for use on an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the radial transmission function drops off to 90% of the central value at a radius $R_1$ and to 10% of the central value at a radius $R_2$, wherein $(R_2-R_1)<R_1$.

13. The shutter according to claim 12, wherein the radial transmission function drops off to 90% of the central value at a radius $R_1$ and to 10% of the central value at a radius $R_2$, wherein $(R_2-R_1)>0.1\ R_1$, and wherein $R_2/R_1-1=0.8\pm0.1$.

14. The shutter according to claim 12, wherein the quantity n is a whole-number multiple of the value 5, 6 or 7.

15. The shutter according to claim 12, wherein the shutter has a star-shaped transition area outside of a circular central area.

16. The shutter according to claim 12, wherein the shutter is arranged behind a prism or an achromat or a negative individual lens.

17. A shutter, for use on an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the shutter is vacuum-deposited on a lens as an opaque layer.

18. The shutter of claim 17, wherein the opaque layer is a metal.

19. The shutter according to claim 17, wherein the shutter is a vacuum-deposited on a front plane surface of the lens.

20. The shutter according to claim 17, wherein the shutter is arranged on the foremost lens of the objective.

21. A CCD-camera for an endoscope, having a shutter for use as an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the radial transmission function drops off to 90% of the central value at a radius $R_1$ and to 10% of the central value at a radius $R_2$, wherein $(R_2-R_1)>0.1\ R_1$.

22. A CCD-camera for an endoscope, having a shutter for use as an objective, for improving the depth of focus in a camera, said shutter comprising:

in a central area, means for providing a radially uniform transmission function averaged over the circumferential angle, said radial transmission function first dropping off toward zero in a radial transition area which is a continuation of said central area and which has a quantity n of cutouts which extend toward the radial outside and are spaced apart from one another at equal angles 360°/n in the circumferential direction, and the quantity n of cutouts has the value 5, 6 or 7, and wherein the radial transmission function drops off to 90% of the central value at a radius $R_1$ and to 10% of the central value at a radius $R_2$, wherein $(R_2-R_1)<R_1$.

* * * * *